United States Patent
Hu et al.

(10) Patent No.: US 9,369,202 B2
(45) Date of Patent: Jun. 14, 2016

(54) ELASTIC CLIENT INTERFACE FOR TUNABLE OPTICAL TRANSPONDER

(71) Applicant: NEC Laboratories America, Inc., Princeton, NJ (US)

(72) Inventors: Junqiang Hu, Davis, CA (US); Ting Wang, West Windsor, NJ (US)

(73) Assignee: NEC Corporation (JP)

( * ) Notice: Subject to any disclaimer, the term of this patent is extended or adjusted under 35 U.S.C. 154(b) by 70 days.

(21) Appl. No.: 14/244,253

(22) Filed: Apr. 3, 2014

(65) Prior Publication Data

US 2014/0301733 A1 Oct. 9, 2014

Related U.S. Application Data

(60) Provisional application No. 61/808,941, filed on Apr. 5, 2013.

(51) Int. Cl.
| | |
|---|---|
| *H04B 10/00* | (2013.01) |
| *H04B 10/079* | (2013.01) |
| *H04B 10/40* | (2013.01) |
| *H04J 14/08* | (2006.01) |
| *H04Q 11/00* | (2006.01) |

(52) U.S. Cl.
CPC ........ *H04B 10/0795* (2013.01); *H04B 10/0793* (2013.01); *H04B 10/40* (2013.01); *H04J 14/08* (2013.01); *H04Q 11/0062* (2013.01); *H04Q 2011/0086* (2013.01)

(58) Field of Classification Search
CPC ........... H04B 10/0795; H04B 10/0793; H04B 10/40; H04B 10/43; H04J 14/08; H04Q 11/0062; H04Q 2011/0086
USPC .............. 398/135, 138, 139, 128, 130, 25, 98
See application file for complete search history.

(56) References Cited

U.S. PATENT DOCUMENTS

2002/0003645 A1* 1/2002 Kim .................... H04W 88/085
398/115

* cited by examiner

*Primary Examiner* — M R. Sedighian
(74) *Attorney, Agent, or Firm* — Joseph Kolodka (57) ABSTRACT

There are provided an optical transponder having a first end and a second end, as well as an electric switch having the transponder. The transponder includes an optical interface, at the first end, having a variable rate optical transmitter and a variable rate optical receiver to respectively transmit and receive signals using at least one of different bandwidths and different bit rates. The transponder further includes an electrical interface, at the second end, having an electrical interface throughput matching an optical capacity of the optical interface. The transponder also includes a processor for controlling the optical capacity.

15 Claims, 8 Drawing Sheets

ELASTIC CLIENT INTERFACE FOR TUNABLE OPTICAL TRANSPONDER

RELATED APPLICATION INFORMATION

This application claims priority to provisional application Ser. No. 61/808,941 filed on Apr. 5, 2013, incorporated herein by reference.

BACKGROUND

1. Technical Field

The present invention relates to signal processing, and more particularly to an elastic client interface for a tunable optical transponder.

2. Description of the Related Art

Recent technology innovations in optical transponders have enabled the generation of a flexible modulation format and symbol rate, which leads to flexible bandwidth usage. Innovations in optical switches have enabled gridless optical spectrum switching which means the flexible selection of any frequency and any bandwidth. These innovations contribute to the paradigm of an elastic network, allowing service providers to satisfy the network's increasing needs without excessive investment.

An ideal elastic network requires one more feature to fully reflect the network needs: the spectrum usage shall be adaptive to the traffic capacity, not just the interface rate. However, the current interfaces with client networks are mostly fixed rate, and to ensure no traffic loss, the core network side of the optical transponder matches that fixed rate, irrespective of the actual throughput. This problem blocks the possibility to further reduce spectral utilization.

Figure 1:
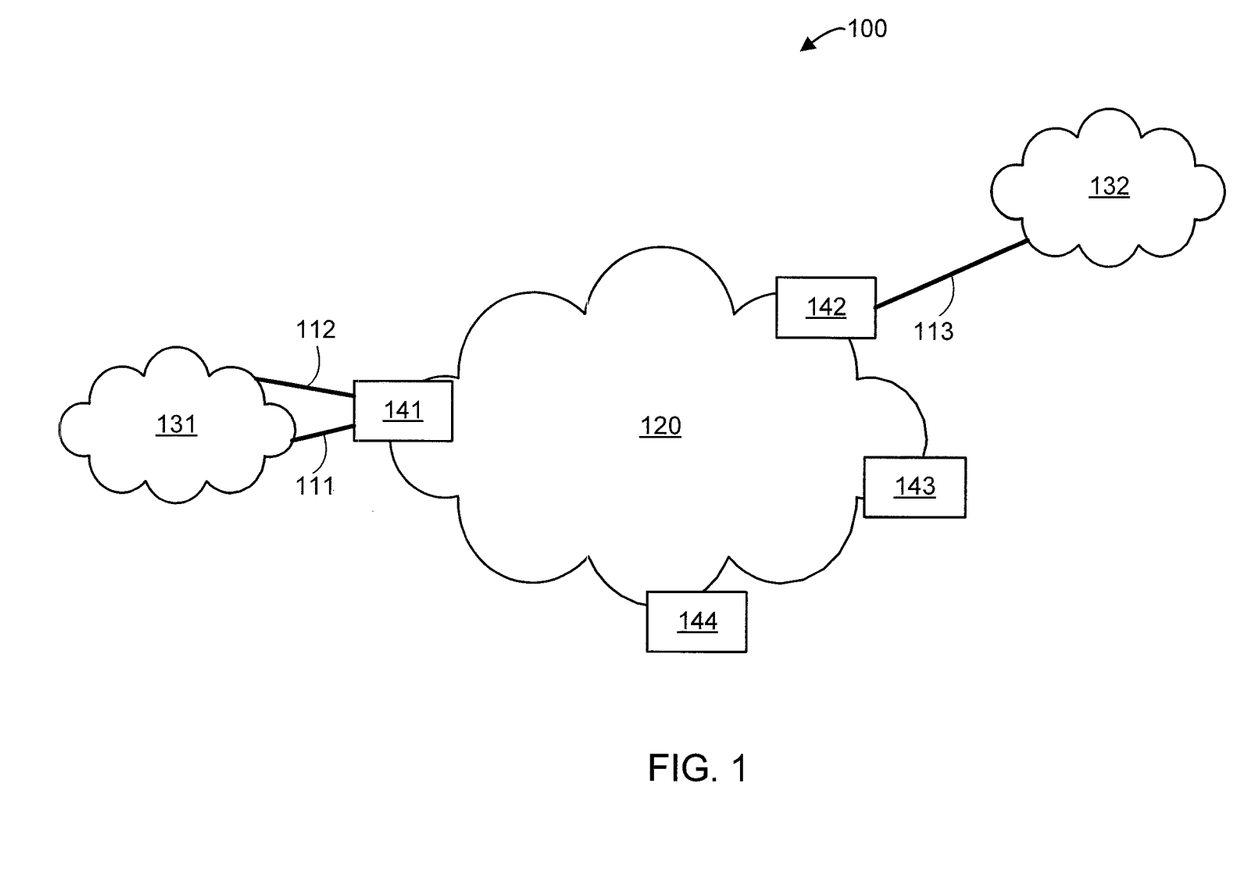
FIG. 1 shows a network environment 100 with fixed rate client interfaces 111, 112, and 113, in accordance with the prior art.

FIG. 1 shows a network environment 100 with fixed rate client interfaces 111, 112, and 113, in accordance with the prior art. The network environment 100 includes a flexgrid all-optical network 120, client networks 131 and 132, optical transponders 141, 142, 143, and 144, and the fixed rate client interfaces 111, 112, and 113. Disadvantageously, the client interfaces 111, 112, and 113 are fixed rate.

SUMMARY

These and other drawbacks and disadvantages of the prior art are addressed by the present principles, which are directed to an elastic client interface for a tunable optical transponder.

According to an aspect of the present principles, there is provided an optical transponder having a first end and a second end. The transponder includes an optical interface, at the first end, having a variable rate optical transmitter and a variable rate optical receiver to respectively transmit and receive signals using at least one of different bandwidths and different bit rates. The transponder further includes an electrical interface, at the second end, having an electrical interface throughput matching an optical capacity of the optical interface. The transponder also includes a processor for controlling the optical capacity.

According to another aspect of the present principles, there is provided an electric switch. The electric switch includes an optical transponder having a first end and a second end. The optical transponder includes an optical interface, at the first end, having a variable rate optical transmitter and a variable rate optical receiver to respectively transmit and receive signals using at least one of different bandwidths and different bit rates. The optical transponder further includes an electrical interface, at the second end corresponding to a fabric side of the electric switch, having a fabric side throughput matching an optical capacity of the optical interface. The optical transponder also includes a processor for controlling the optical capacity.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to an elastic client interface for a tunable optical transponder.

Figure 2:
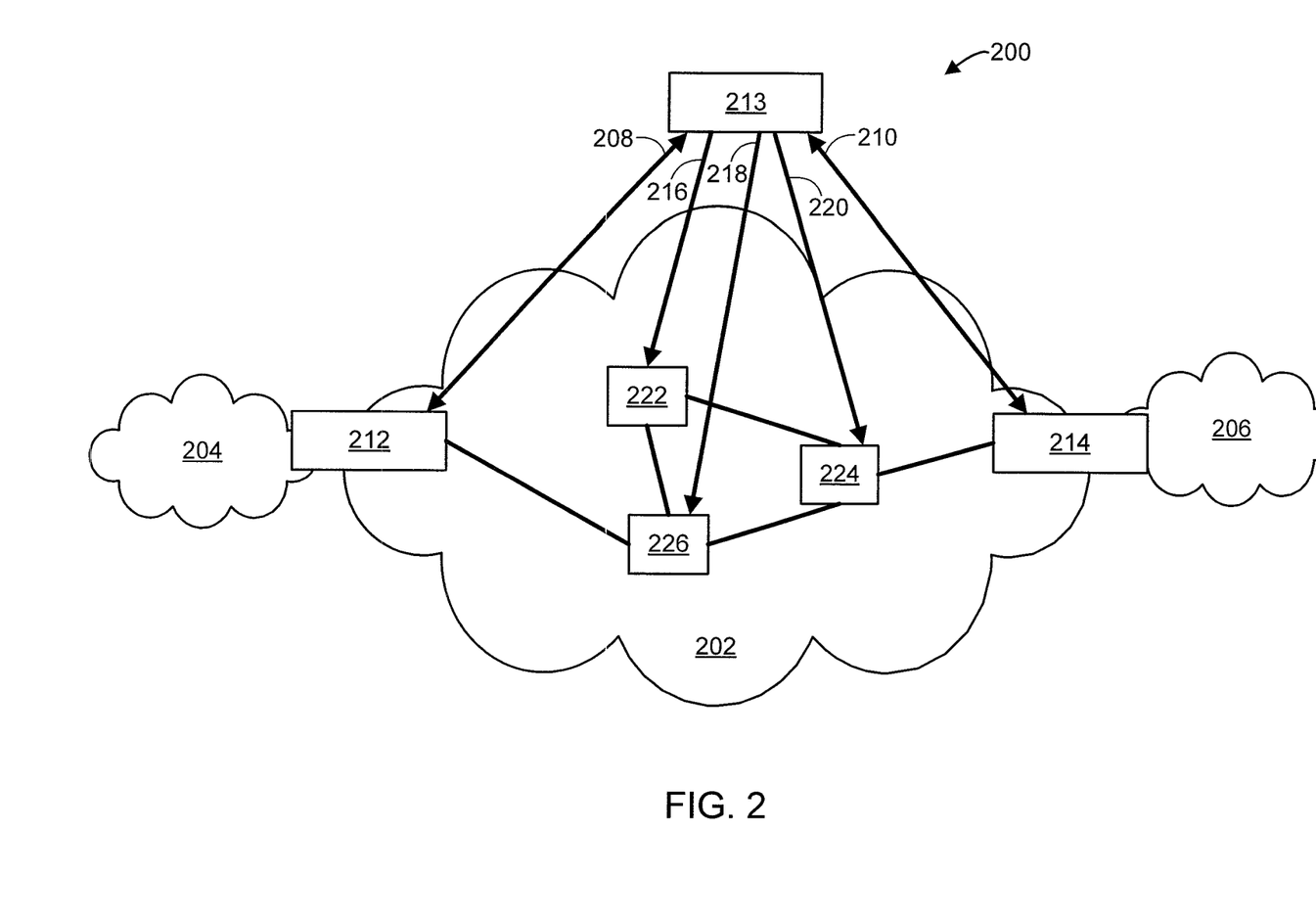
FIG. 2 shows an exemplary network environment 200 to which the present principles can be applied, in accordance with an embodiment of the present principles.

FIG. 2 shows an exemplary network environment 200 to which the present principles can be applied, in accordance with an embodiment of the present principles. The network environment 200 includes a wavelength/optical-spectrum switched network (hereinafter "optical network" in short) 202, electrically switched networks (also referred to herein as "client networks") 204 and 206, optical network controller 213, optical interface control channels 208 and 210, tunable optical transponders 212 and 214, optical path control channels 216, 218, and 220, and switches 222, 224, and 226.

Figure 3:
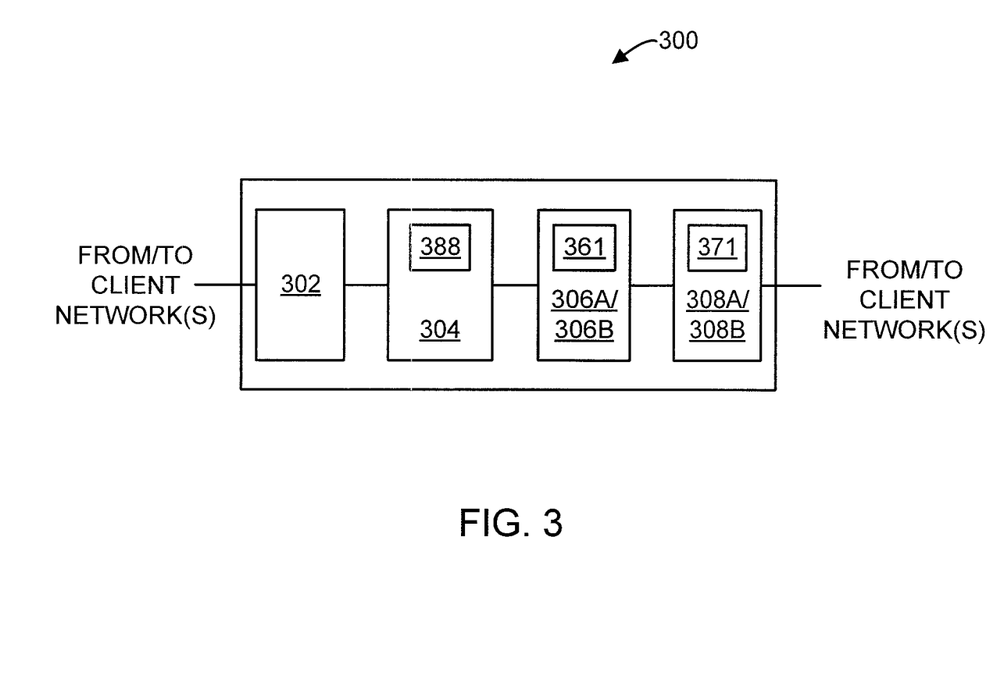
FIG. 3 shows an exemplary optical transponder 300, in accordance with an embodiment of the present principles.

FIG. 3 shows an exemplary optical transponder 300, in accordance with an embodiment of the present principles. The optical transponder 300 can be, for example, any of optical transponders 212 and 214. The optical transponder 300 includes a physical interface 302 to the client networks (e.g., networks 204 and 206), and a client side packet/frame processor 304.

In the direction from a client network (e.g., networks 204 and 206) to the optical network 202, the optical transponder 300 further includes a variable rate electrical signal generator 306A and a variable rate optical modulator 308A. The electrical signal generator 306A can be, for example, a digital signal processor (DSP) and so forth. In the direction from the optical network 202 to a client network (e.g., networks 204 and 206), the optical transponder 300 further includes a variable rate optical receiver 306B and a variable rate signal demodulator 308B. The signal demodulator 308B can be, for example, a digital signal processor (DSP) and so forth.

While shown separately, in other embodiments, the functions of the signal generator 306A and modulator 308A can be combined into a single particular element, and the functions of the optical receiver 306B and the demodulator 308B can be combined into a single given element, where the particular element and the given element are the same element (e.g., an optical transceiver) or different elements. Hence, the signal generator 306A and the modulator 308A are also collectively referred to herein as "an optical transmitter" in short, while the optical receiver 306B and the demodulator 308B are also collectively referred to herein as "an optical receiver" in short. These and other variations of the elements of FIG. 3 are readily determined by one of ordinary skill in the art given the teachings of the present principles provided herein, while maintaining the spirit of the present principles.

Reference will now be made to FIGS. 2 and 3. The present principles are related to a tunable optical transponder (e.g., optical transponders 212 and 214) which works as the bridge between an electrically switched network (networks 204 and 206) and an optical network 202. For the direction from the electrical network 202 to an optical network (e.g., networks 204 and 206), a transponder has the signal generator 306A (including a transmission related electrical processor 361) and the optical modulator 308A to convert the signal to the format suitable for WDM (wavelength division multiplexing) switching (via switches 222, 224, and/or 226) and transmission. For the direction from the optical network 202 to an electrical network (networks 204 and 206), the optical receiver 308B and demodulator 306B (including a reception related electrical processor 371) demodulate the received optical signal, and convert the received signal back to the format required by the electrical network (networks 204 and 206). The optical transceiver has the capability to adjust the modulation format, bit rate, and signal bandwidth, to adapt to the requirement of spectrum usage, transmission capacity, and signal quality. The interface 302 to the client network is in communication with processor 304 with the capabilities of adapting to the optical data rate, and/or estimating the required traffic capacity, to match the capacity between the client networks 204 and 206 and the optical network 202. The physical interface 302 to the client network 204 and 206 can be either optical or electrical. The optical interface has the channel to communicate with the optical network controller 213 (such as channel 208 and 210), which can modify the optical path (e.g., through control paths 216, 218, and 220) to meet the bandwidth requirement. In an embodiment, the transmission related electrical processor 361 and the reception related electrical processor 371 can be the same processor or different processors. In an embodiment, the client side processor 304 can be the same processor as transmission related electrical processor 361 and/or the reception related electrical processor 371.

A description will now be given of a first embodiment directed to using flow control to regulate client traffic, and allocating optical capacity based on an estimated throughput request.

Assume the client interface 302 has a flow control feature, which means the transaction can be disabled by sending XOFF and enabled by sending XON. Electrical processor 304 has a buffer 388 that is able to tolerant the reaction delay when XOFF is sent, and to avoid traffic underflow when XON is sent. Whenever the buffer usage is above threshold 1 ($TH_1$), processor 304 sends XOFF to the connected client equipment; whenever the buffer usage is below threshold 2 ($TH_2$, where $TH_1 > TH_2$), 304 sends XON to enable traffic receiving.

The client rate regulation is actually determined by the optical transmission rate because the readout rate of the buffer 388 of the processor 304 cannot exceed the optical capacity. Note that $TH_2$ may be dynamically adjusted based on allocated optical capacity. This method is shown in FIG. 4.

Figure 4:
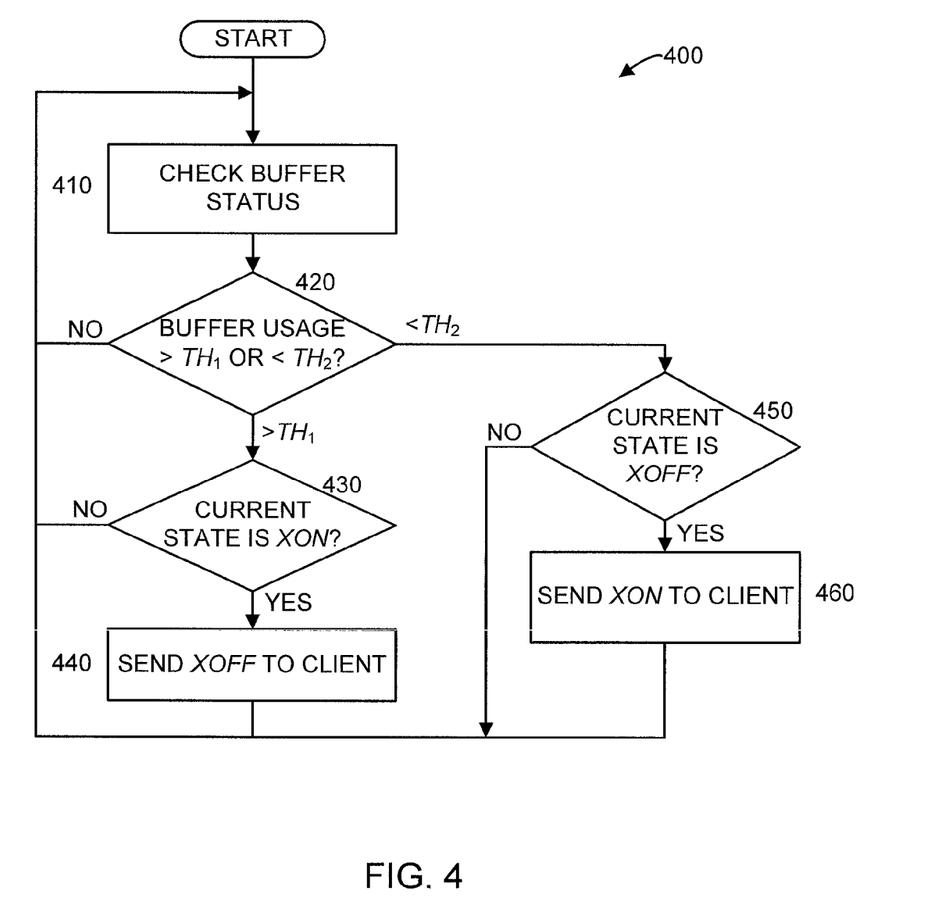
FIG. 4 shows a method 400 for flow control, in accordance with an embodiment of the present principles.

FIG. 4 shows a method 400 for flow control, in accordance with an embodiment of the present principles. At step 410, check the buffer status. At step 420, determine whether the buffer usage is larger than $TH_1$ or less than $TH_2$. If the buffer usage is larger than $TH_1$, then the method continues to step 430. If the buffer usage is smaller than $TH_2$, then the method continues to step 450. If the buffer usage is not larger than $TH_1$ or smaller than $TH_2$, then the method returns to step 410.

At step 430, determine whether the current state is XON. If so, then the method continues to step 440. Otherwise, the method returns to step 410.

At step 440, send XOFF to the client network, and return to step 410.

At step 450, determine whether the current state is XOFF. If so, then the method continues to step 360. Otherwise, the method returns to step 410.

At step 460, send XON to the client network.

On the other hand, optical transmission capacity shall be adjusted based on client traffic throughput, to provide enough pipe and avoid traffic congestion. This is achieved by monitoring or estimating the traffic throughput and allocating the needed optical capacity accordingly. There are two scenarios to consider: to increase capacity when traffic volume goes higher; and to decrease capacity when traffic volume goes lower.

A description will now be given relating to traffic volume going higher. When overall traffic volume is higher than optical capacity, processor 304 will frequently send XOFF (and then XON when buffer 388 is below $TH_2$) to its connected client. However, this may somehow be confused with the case of burst traffic. For example, if the current burst is a short burst that is treated as a higher bandwidth need, it may result in under usage of the optical spectrum and/or too frequent capacity adjustment which may overhaul the capability of the controller (e.g., controller 213). Moreover, if the traffic amount increase is treated as a burst and an increasing-bandwidth request is not sent promptly, it may affect the network throughput or cause longer traffic delay. One embodiment involves defining the burst length threshold $BL_1$. Transponder monitors the receiving traffic burst length BT, which is counted from the time it sends XON following an XOFF, to when it encounters a silent period in the receiving link while the state is XON. If BT is longer than $BL_1$, it is considered that the traffic amount is larger than the current optical pipe capacity, so the request to increase optical capacity shall be sent. This method is shown in FIG. 5.

Figure 5:
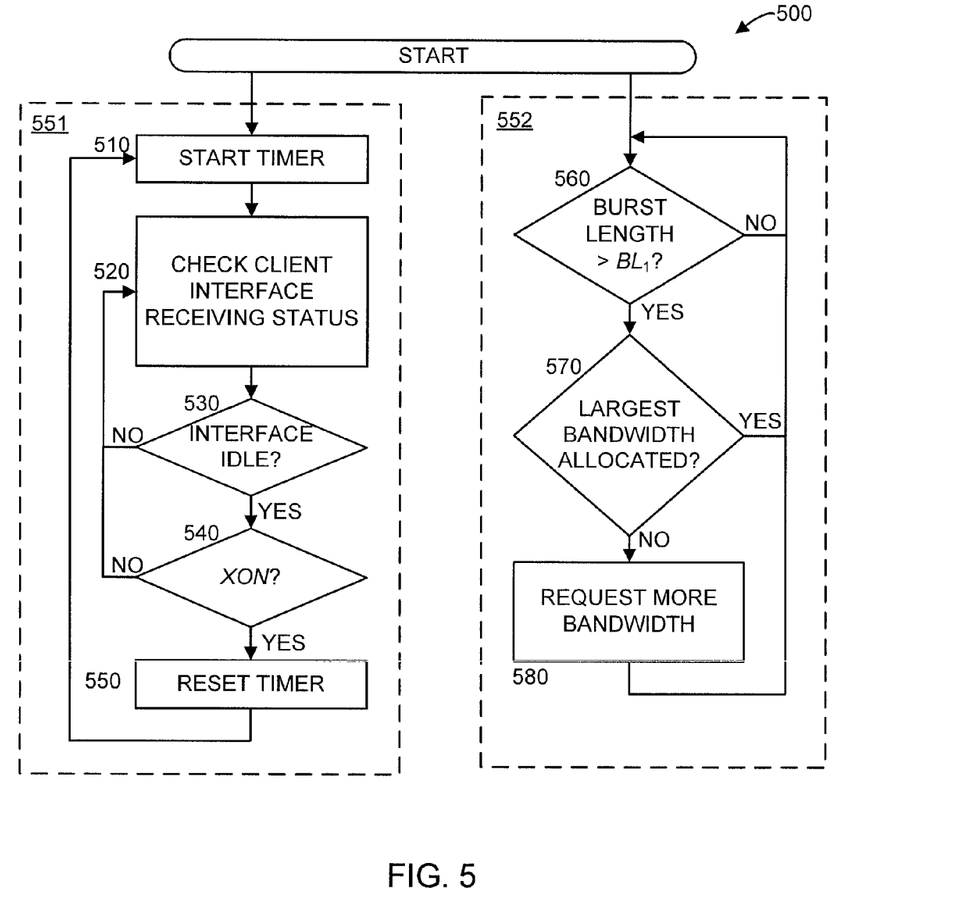
FIG. 5 shows a method 500 to increase bandwidth based on detected burst length, in accordance with an embodiment of the present principles.

FIG. 5 shows a method 500 to increase bandwidth based on detected burst length, in accordance with an embodiment of the present principles. The method includes a burst length calculation branch 551 and a bandwidth request branch 552. Steps 510, 520, 530, 540, and 550 pertain to the burst length calculation branch 551. Steps 560, 570, and 580 pertain to the bandwidth request branch 552.

At step 510, start a timer. At step 520, check the client interface receiving status. At step 530, determine if the client interface 302 is idle. If so, then the method continues to step 540. Otherwise, the method returns to step 520.

At step 540, determine if current state is XON. If so, then the method continues to step 550. Otherwise, the method returns to step 520.

At step 550, reset the timer, and return to step 510.

At step 560, determine if the burst length (timer_value*rate) is less than $BL_1$. If so, then the method continues to step 570. Otherwise, the method returns to step 560.

Alternatively, the burst length is defined as the period PL that client interface processor 304 keeps the electrical signal generator 306A and optical modulator 308A fully loaded; in case PL>$BL_1$ and XOFF is sent, it is considered as increased traffic volume, so optical capacity shall be larger. This method is shown in FIG. 6.

Figure 6:
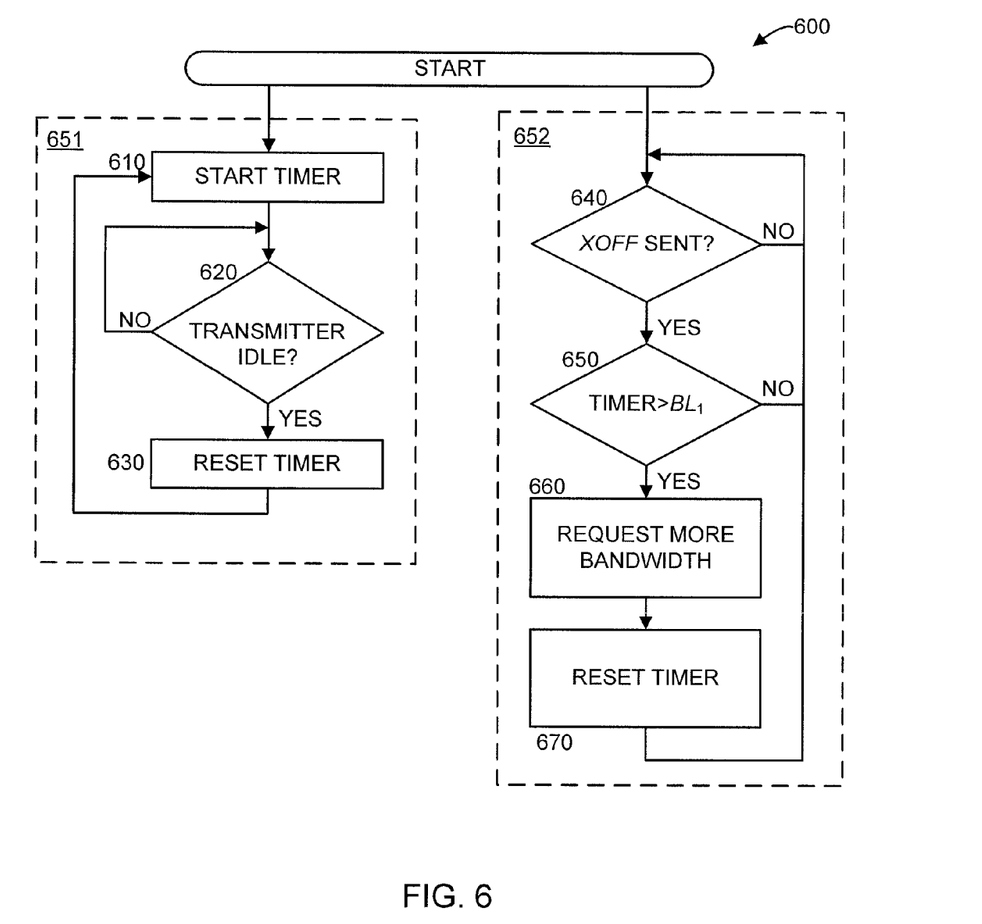
FIG. 6 shows a method 600 to increase bandwidth based on optical transmitter burst length and XON/OFF status, in accordance with an embodiment of the present principles.

FIG. 6 shows a method 600 to increase bandwidth based on optical transmitter burst length and XON/OFF status, in accordance with an embodiment of the present principles. The method includes a transmitter idle monitoring branch 651 and a bandwidth request branch 652. Steps 610, 620, and 630 pertain to the transmitter idle monitoring branch 651. Steps 640, 650, 660, and 670 pertain to the bandwidth request branch 652.

At step 610, start a timer. At step 620, determine whether the transmitter is idle. If so, then the method continues to step 630. Otherwise, the method returns to step 620.

At step 630, reset the timer, and return to step 610.

At step 640, determine whether XOFF was sent. If so, then the method continues to step 650. Otherwise, the method returns to step 640.

At step 650, determine whether timer (timer_value) is less than $BL_1$. If so, then the method continues to step 660. Otherwise, the method returns to step 640.

At step 660, issue a request for more bandwidth. At step 670, reset the timer, and return to step 640.

Note that for such case, $BL_1$ can be modified whenever optical capacity is adjusted. The step size of optical capacity adjustment shall consider abnormal conditions such as, for example, a drastic increase of traffic volume to the maximum link capacity. It shall be the result of allowed response time (i.e., from the time traffic volume increases, to the time the link capacity shall be settled to accommodate the increase), capacity adjustment (i.e., maximum optical capacity minus the current allocated capacity), the path responding speed, and allowed request frequency (how many requests are allowed in one second—this is the number to avoid controller overhauling). The preceding are merely illustrative and, thus, other criteria or variation of the preceding criteria can also be used in accordance with the teachings of the present principles, while maintaining the spirit of the present principles.

A description will now be given relating to traffic volume going lower. When traffic volume goes lower, client processor 304 will encounter an idle period in sending data to signal generator 306A. Unlike the case when traffic volume goes higher, here the slow response will not cause traffic congestion or extra delay. Thus, one embodiment is to monitor the traffic before taking any action. Traffic can be characterized as average throughput, burst case throughput, and burst length. Optical capacity adjustment can be done based on a pre-configured policy such as, for example, (1+x)*average_throughput where x is the speedup. The burst length threshold $BL_1$ given above can be updated based on a monitoring result as well, to better reflect the actual traffic pattern. Alternatively, optical capacity is reduced step by step by level $C_r$, when the average of monitored unused capacity is larger than $C_r$.

During system initialization, the allocated optical capacity can be at its maximum, or based on pre-knowledge or client network policy settings. The high-level method is shown in FIG. 7.

Figure 7:
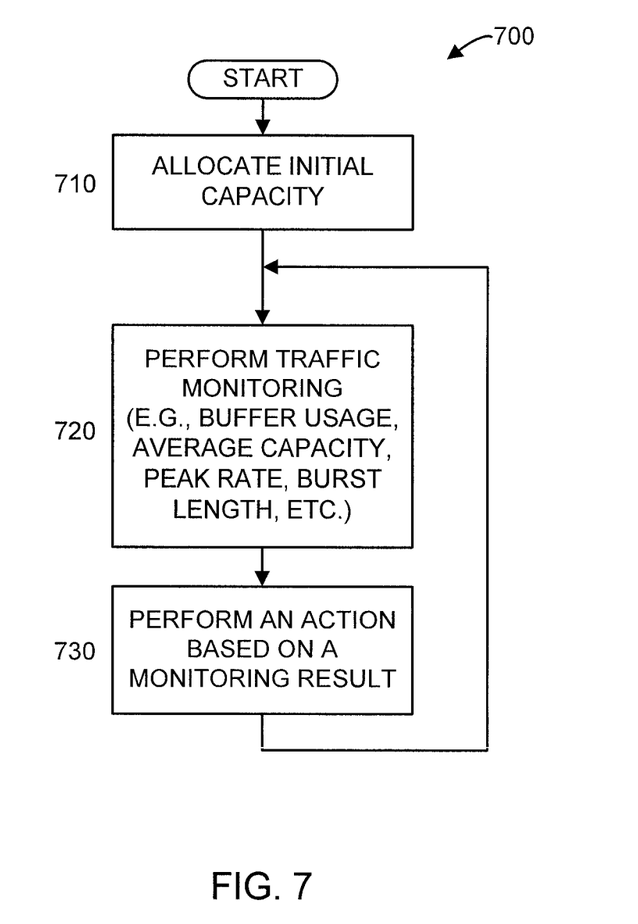
FIG. 7 shows a method 700 to increase bandwidth based on optical transmitter burst length and XON/OFF status, in accordance with an embodiment of the present principles.

FIG. 7 shows a method 700 to adjust bandwidth through traffic monitoring, in accordance with an embodiment of the present principles. At step 710, allocate an initial capacity. At step 720, perform traffic monitoring (e.g., buffer usage, average capacity, peak rate, burst length, etc.). At step 730, perform an action based on a monitoring result, and return to step 720.

A description will now be given of a second embodiment directed to avoiding under-allocating optical capacity.

This embodiment refers to the case that optical capacity is always (or at the best effort) set to a rate that is higher than the client traffic rate, up to its maximum capacity. Optical capacity is allocated based on the past and predicted client traffic throughput, to avoid traffic overflow as much as it can. The transponder continuously monitors client traffic, including the average throughput for time periods such as, for example, the past hour, peak throughput within the past 5 minutes, traffic growing trend (like the curve of average throughput for each 5 minutes), and burst length. Of course, the preceding time periods are illustrative and, thus, other time periods can also be used.

In one embodiment, the optical capacity is allocated with reference to the peak throughput ($TH_p$), with some pre-defined room (ratio) for higher tolerance, for example 1.2*$TH_p$. This ratio can also be adjusted based on the past traffic growing trend, and the historical statistics like time of the day or day of the week.

If the client interface 302 supports flow control using XON/XOFF, whenever the queue size is above threshold $TH_1$, the transponder will send XOFF; when it's below $TH_2$, it will send XON. This operation is same as that described for the first embodiment.

There is also the case that the client interface 302 does not have a flow control feature. The transponder will need a large buffer 388 to tolerant drastic traffic volume change and large burst size. In such case, if the burst can be accommodated by the available buffer 388, the capacity to allocate will be the same as the above mentioned; otherwise, extra capacity will be needed. In one embodiment, the buffer 388 has the capacity at least to accommodate one burst, plus the traffic volume ($C_{fr}$) of full-rate for request-reaction period. Given threshold $TH_3$, when the queue length is larger than $TH_3$, transponder will request for higher optical capacity. The additional capacity to request is determined by the available buffer size, the client link data rate, the upcoming traffic estimation (under the given confidence), and the request-reaction latency for capacity adjustment. In one embodiment, client link rate is $R_C$, available buffer size is $B_a$, request-reaction time is $T_r$, the additional optical capacity that can be allocated is $C_a$, then for each request, the added bandwidth can be, for example, $C_a$/(lowest_integer($B_a/(R_c*T_r)$)). This is to guarantee that even when the client interface 302 becomes fully loaded, there will not be traffic loss, by growing to maximum optical rate before the buffer 388 goes full. $TH_3$ shall be larger than the maximum burst length, so that burst traffic within certain range can be accommodated without requesting for larger bandwidth. Alternatively, it may request for highest available capacity, if consider this belongs to the abnormal case which rarely happens. Capacity adjustment for queue length below $TH_3$ still follows the same procedure as mentioned above, which is to allocate based on the monitoring result and prediction.

A description will now be given of a third embodiment directed to a channelized TDM interface, with optical capacity based on connected TDM channels.

For a channelized TDM interface, the client link capacity can be known based on the established connections, and the optical capacity matches the total allocated channel capacity. For channels carrying packets applications, such as Ethernet over ODU/OPU (optical data/protocol unit) using GFP (Generic Framing Procedure), if the packets can be extracted and re-encapsulated, the capacity variation may follow the same procedure as mentioned in the first and second embodiments. Otherwise, it is treated the same as fixed TDM channel.

A description will now be given of a fourth embodiment directed to a transponder integrated into an electrical switch, with optical capacity based on monitored and predicted traffic volume.

Figure 8:
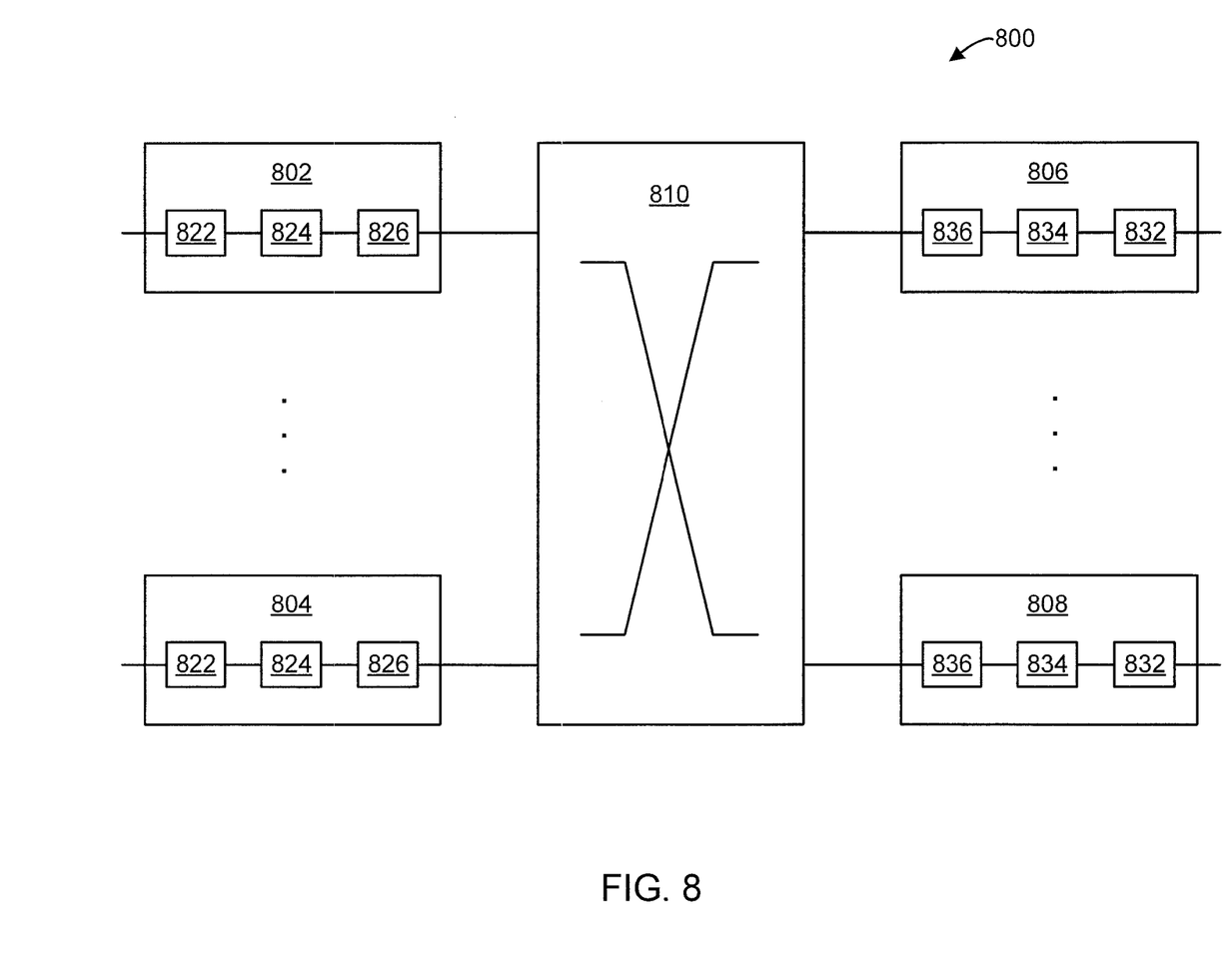
FIG. 8 shows an integrated switch architecture 800, in accordance with an embodiment of the present principles.

When a transponder is integrated into an electrical switch, there will be associated queues for the transponder, so optical capacity allocation will be the same as the second embodiment, for the particular case with a large integrated buffer 388. For a standalone transponder that is able to get queuing information from its connected switch, it is the special case of the integrated solution, so the procedure will be the same as well. It is to be appreciated that the optical transponder in accordance with the present principles can be incorporated into switches such as, for example, switches 222, 224, and 226. FIG. 8 shows an integrated switch architecture 800, in accordance with an embodiment of the present principles. A switch 800 has line cards for client interfaces, such as line card 802 and line card 804, connecting to client networks (such as client networks 204 and 206). The switch 800 also has line cards for optical interfaces (such as optical line cards 806 and 808) with integrated optical transponders, connecting to an optical network (such as network 202). The switch 800 further has a switch fabric 810. Client line cards 802 and 804 have a client interface 822 (equivalent to interface 302), a client traffic processor 824, and a queuing and fabric interface 826. Optical line cards 806 and 808 have an optical interface 832 which is the simplified illustration of 306A/306B/308A/308B, a traffic processor 834, and a queuing and fabric interface 836. Function-wise, elements 826 and 836 have the same functions, and elements 824 and 834 have the same function. Queuing is either done at a source port using Virtual Output Queuing (VOQ), or at an output port. The traffic amount to the optical transponder is considered as the volume switched from fabric 810 to that optical line card. Queue status monitoring is based on the corresponding VOQ or the output buffer for the optical line card.

Thus, the present principles use several schemes to solve the aforementioned problems of the prior art.

One such scheme involves using flow control to limit the traffic rate from client to transponder, to match the allocated optical capacity. If the rate is higher than what the transponder has allocated, it sends back XOFF to disable traffic receiving for a while. Optical capacity matches the monitored traffic rate; if the monitored or predicted traffic rate is higher than the current optical capacity, the transponder requests higher bandwidth.

The method for increasing optical capacity decision is based on monitored burst length, which is counted from the time it sends XOFF, to when it encounters a silent period in the receiving link while the state is XON. If BT is longer than the burst length threshold $BL_1$, it is considered that the traffic amount is larger than the current optical pipe, so the request to increase optical capacity shall be sent. Alternatively, the burst length is defined as the period PL that the optical transmitter is fully loaded; in case PL is larger than the configured threshold $BL_1$ and XOFF is sent, it is considered as increased traffic volume, so optical capacity shall be larger.

Another scheme involves monitoring client interface traffic throughput, and adjusting optical rate accordingly. The transponder has a buffer 388 for burst regulation, and to hold the excessive data while requesting bandwidth adjustment. The transponder requests higher bandwidth when buffer usage exceeds a pre-configured threshold.

Yet another scheme is allocating optical bandwidth/capacity based on TDM channel capacity, in case the client interface is channelized TDM.

Still another scheme is implementing the transponder an interface on an electrical switch. The transponder monitors the traffic throughput and/or queue length to decide the needed bandwidth, and request the determined amount accordingly.

Thus, the present principles advantageously enable the adaptation of optical spectrum with client traffic capacity, which helps to save optical spectrum usage, and indirectly helps to reduce power consumption. Higher spectrum efficiency means reduced capital expenses for service providers.

In an embodiment, a significant aspect of the present principles involves the combination of flow control (XON/XOFF), traffic statistic, and optical bandwidth modification request, to make the optical capacity close to client traffic rate. XON/XOFF are replaced by a large buffer if they are not supported, and bandwidth request is also decided by queue length in such a case, besides traffic statistics.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. An optical transponder having a first end and a second end, the transponder comprising:
   an optical interface, at the first end, having a variable rate optical transmitter and a variable rate optical receiver to respectively transmit and receive signals using at least one of different bandwidths and different bit rates;
   an electrical interface, at the second end, having an electrical interface throughput matching an optical capacity of the optical interface; and
   a processor for controlling the optical capacity the processor having an internal buffer to adapt to a variable optical rate;
   wherein the electrical interface throughput adjustment for the electrical interface is based on the optical capacity;
   wherein the electrical interface throughput is adjusted using a flow control function that sends a disabling signal for disabling packet reception when a buffer usage is above a first threshold and sends an enabling signal for enabling packet reception when the buffer usage is below a second threshold.

2. The optical transponder of claim 1, wherein the processor is a digital signal processor for selectively changing at least one of a symbol rate, a modulation format, and an allocated bandwidth for transmission and reception performed by the optical interface.

3. The optical transponder of claim 1, wherein the optical capacity is determined based at least one of an allocated bandwidth, an optical channel quality, and an optical modulation format.

4. The optical transponder of claim 1, wherein the electrical interface is a packet interface having a flow control function.

5. The optical transponder of claim 1, wherein an optical capacity adjustment is based on the electrical interface throughput.

6. The optical transponder of claim 5, wherein the optical capacity is adjusted by at least one of adjusting an optical modulation format and increasing or reducing an allocated bandwidth.

7. The optical transponder of claim 5, wherein the electrical interface is a packet interface, and the electrical interface throughput is determined based on a monitored traffic bandwidth.

8. The optical transponder of claim 7, wherein an increase in the optical capacity is determined based on a client burst length, the client burst length calculated by accumulating a non-stopping period from a time an enabling signal is sent following a disabled packet reception phase up to a first detection time of receiver link silence for a receiver link coupled to the optical transponder.

9. The optical transponder of claim 7, wherein the allocated bandwidth is increased when the optical interface is at an allocated maximum load for a pre-defined time period and the electrical interface is currently in a disabled packet reception phase.

10. The optical transponder of claim 7, wherein the allocated bandwidth is indirectly determined from an electrical buffer queue length.

11. The optical transponder of claim 5, wherein the electrical interface is a time division multiplexing interface.

12. The optical transponder of claim 5, wherein the electrical interface throughput is based on a service agreement specifying an average symbol rate and a maximum burst length.

13. The optical transponder of claim 1, wherein the optical capacity is based on a historical maximum traffic throughput at a given time of a given date of one of a week, a month, and a year.

14. The optical transponder of claim 1, wherein the optical capacity is determined based on a traffic prediction.

15. The optical transponder of claim 1, wherein an optical receiver capacity of the variable rate optical receiver is set based on an optical transmitter capacity of the variable rate optical transmitter.

* * * * *